Dec. 24, 1957     O. E. KASE     2,817,292
CARD POSITION SELECTING MEANS
Filed Feb. 1, 1954     14 Sheets-Sheet 1

INVENTOR
OTTO E. KASE
BY George V. Eltgroth
ATTORNEYS

INVENTOR
OTTO E. KASE
BY George V. Feltgroth
ATTORNEYS

Dec. 24, 1957  O. E. KASE  2,817,292
CARD POSITION SELECTING MEANS
Filed Feb. 1, 1954  14 Sheets-Sheet 3
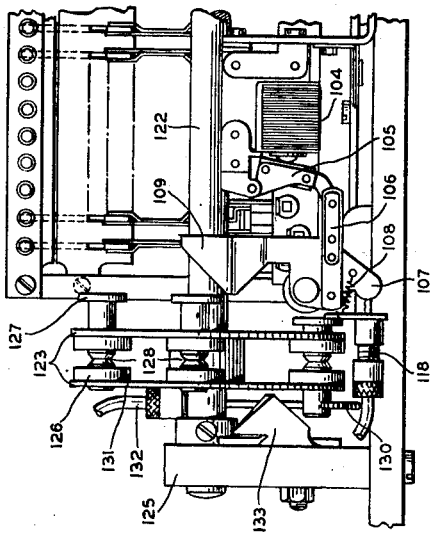
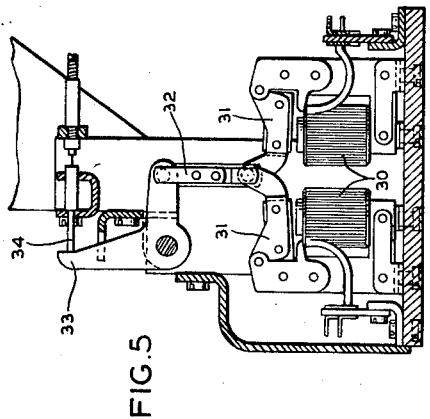
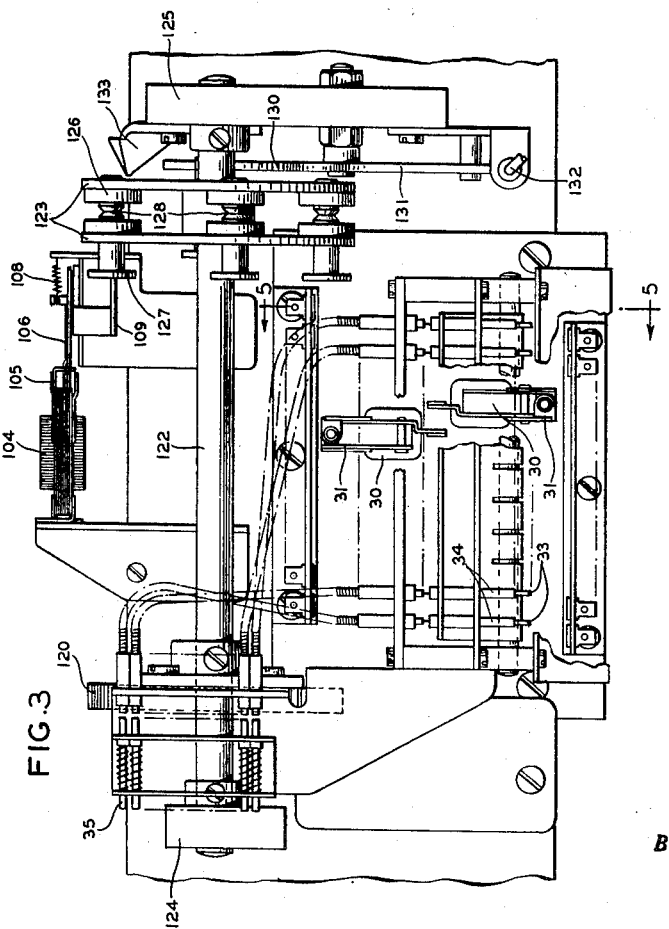
INVENTOR
OTTO E. KASE
BY George V. Eltgroth
   J. L. Sterling
   ATTORNEYS Dec. 24, 1957     O. E. KASE     2,817,292
CARD POSITION SELECTING MEANS
Filed Feb. 1, 1954     14 Sheets-Sheet 4
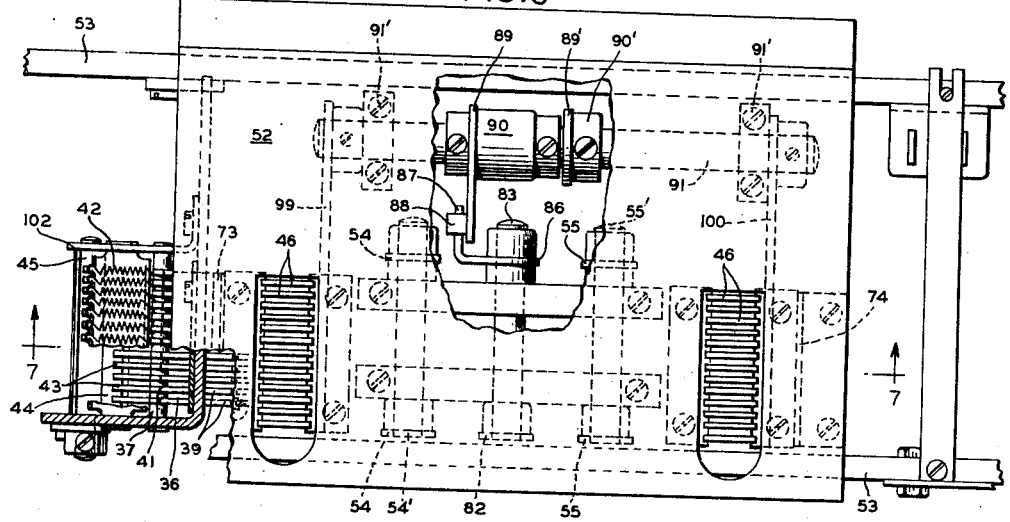
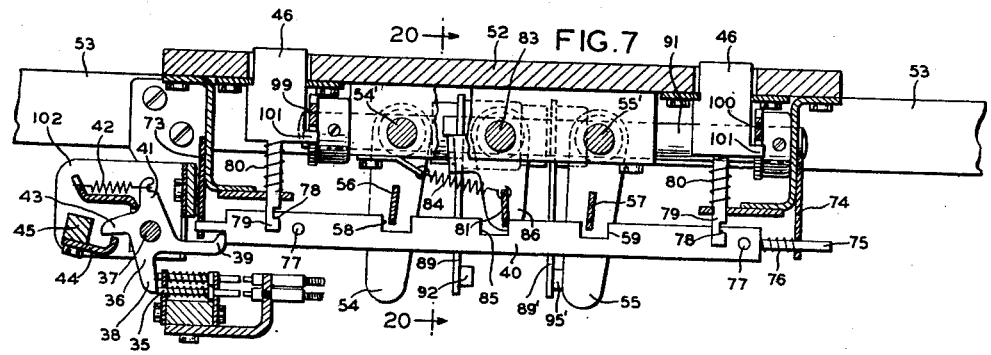
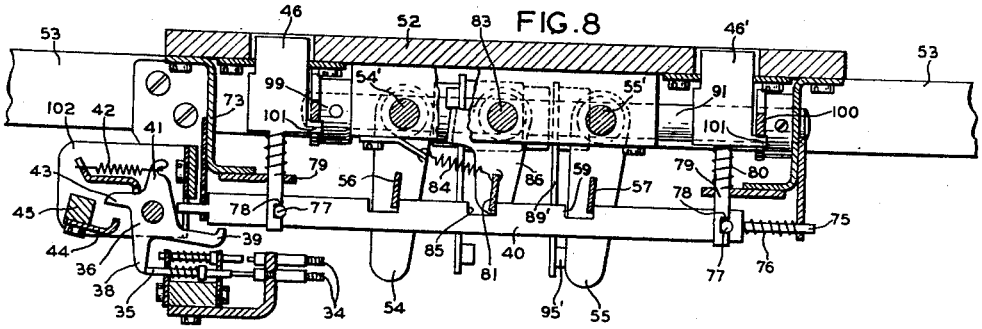
INVENTOR
OTTO E. KASE
BY George V. Eltgroth
ATTORNEYS

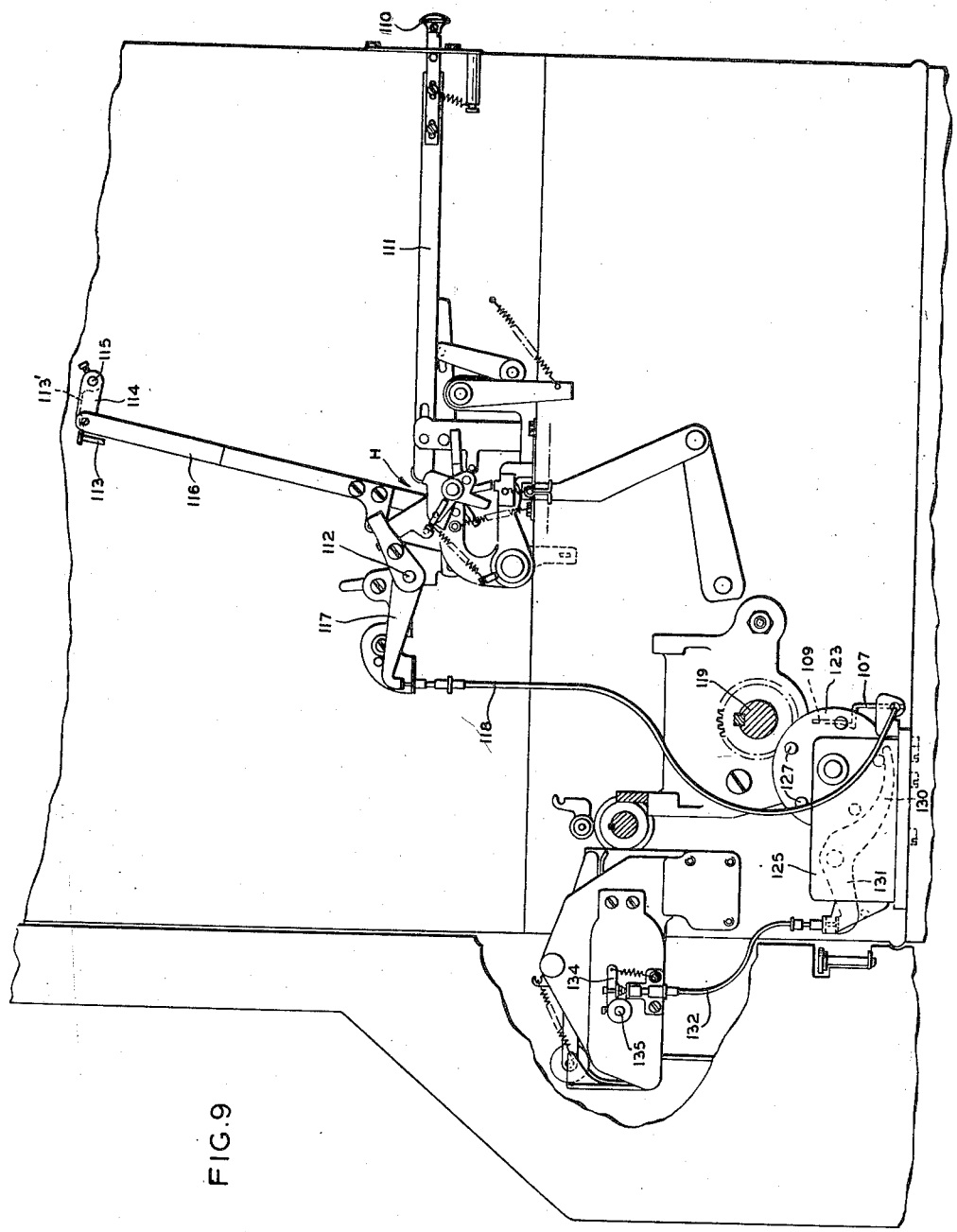

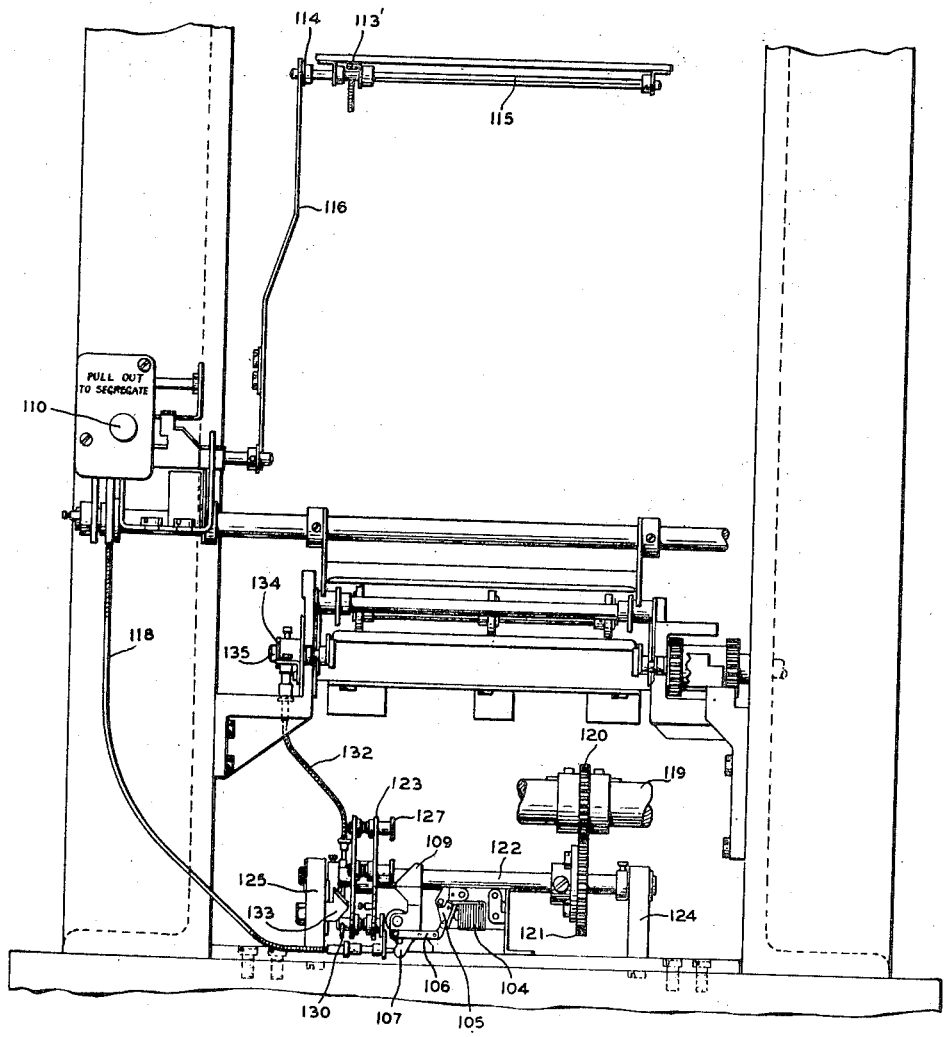

Dec. 24, 1957
O. E. KASE
2,817,292
CARD POSITION SELECTING MEANS
Filed Feb. 1, 1954
14 Sheets-Sheet 7
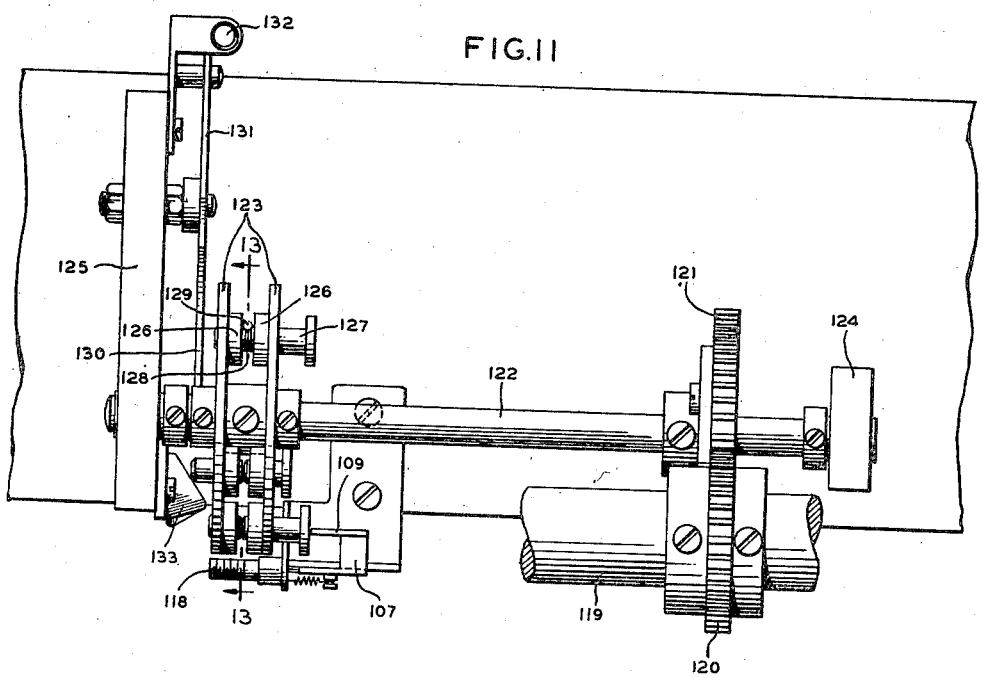
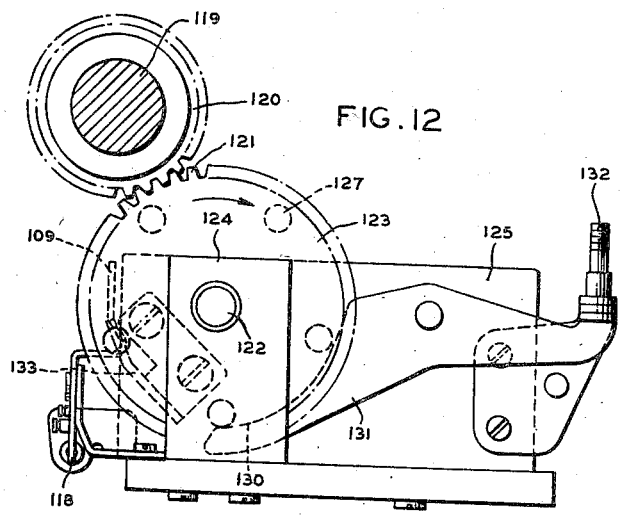
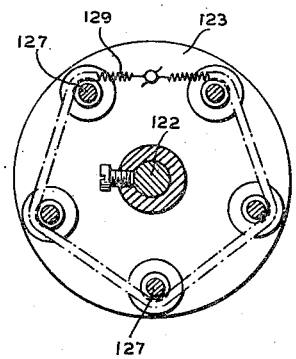
INVENTOR
OTTO E. KASE
BY George V. Eltgroth
ATTORNEYS

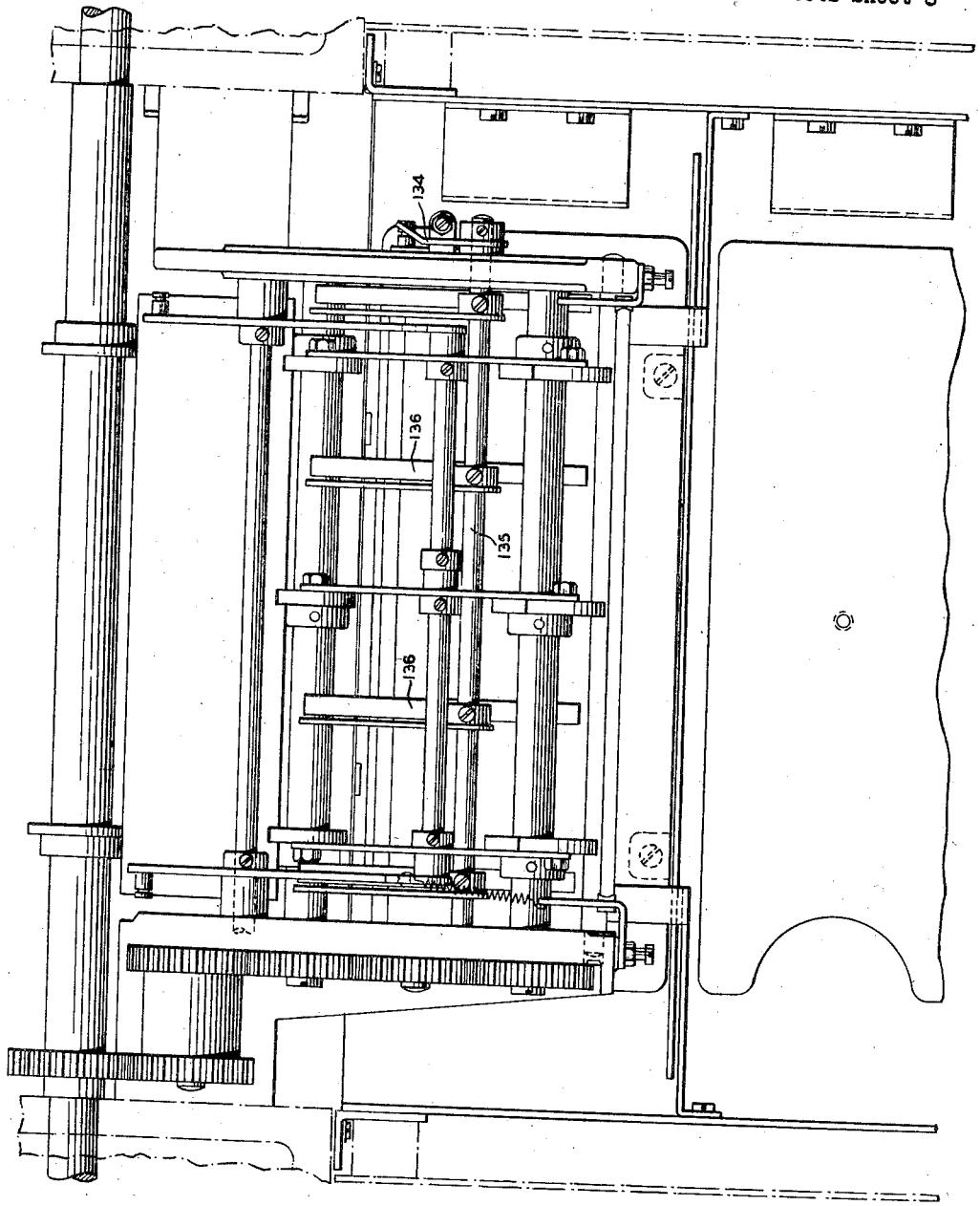

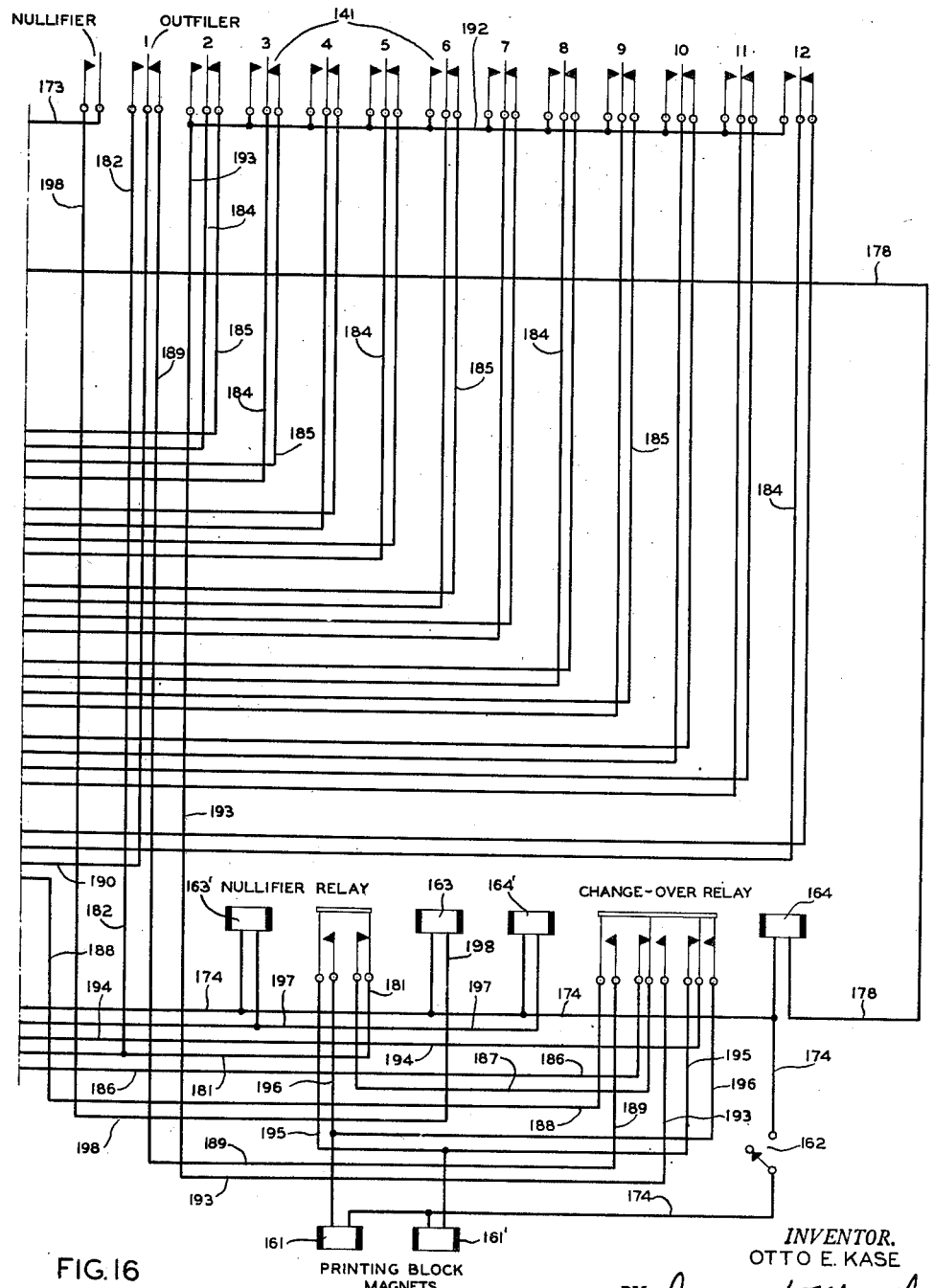

Dec. 24, 1957  O. E. KASE  2,817,292
CARD POSITION SELECTING MEANS
Filed Feb. 1, 1954  14 Sheets-Sheet 11

INVENTOR
OTTO E. KASE
BY George V. Eltgroth
J. L. Sterling
ATTORNEYS

Dec. 24, 1957     O. E. KASE     2,817,292
CARD POSITION SELECTING MEANS
Filed Feb. 1, 1954     14 Sheets-Sheet 12

INVENTOR.
OTTO E. KASE
BY
*George V Eltgroth*
ATTORNEYS

Dec. 24, 1957     O. E. KASE     2,817,292
CARD POSITION SELECTING MEANS
Filed Feb. 1, 1954     14 Sheets-Sheet 13

INVENTOR.
OTTO E. KASE
BY George V. Eltgroth
John L. Sterling
ATTORNEYS

United States Patent Office 2,817,292
Patented Dec. 24, 1957

2,817,292

CARD POSITION SELECTING MEANS

Otto E. Kase, Stamford, Conn., assignor, by mesne assignments, to Sperry Rand Corporation, New York, N. Y., a corporation of Delaware Application February 1, 1954, Serial No. 407,475

19 Claims. (Cl. 101—96)

This invention relates to new and useful improvements in printing interpreters to permit automatic finding of the printing line in any zone of statistical cards, and is an improvement over the invention set forth in a copending application Serial Number 292,324, filed June 7, 1952, now Patent No. 2,764,410, September 25, 1956, and entitled "Improvement in Card Position Selecting Means," in the name of Otto E. Kase and Earl S. Rice.

Formerly the printing line had been determined by manual control means as to whether printing was to take place in the upper or the lower zone of the card. The manual settings of these controls permitted upper zone interpretations, lower zone interpretations, or independent stop interpretations. These settings, however, had permitted printing on only a relatively few lines of the card. In the previous application printing was permitted in one zone on as many as thirteen lines in that zone, using the full forty-five columns for the printing.

It is an object of this invention to provide simple and efficient mechanism whereby the former manual settings are positioned for one zone interpretation, and automatic means are made effective to take over and automatically print in that zone of a trailer card as many as twenty six lines of data sensed in a lead card through the intermediary of control holes punched in the trailer cards. By this means a lead card will enter the machine and the data on the desired zone will be sensed, set up, held, and printed automatically on the proper line of a following trailer card.

A further object is to provide means whereby twenty six lines may be printed in one zone of a card, thirteen lines on one side or field of the zone and thirteen lines on the other side or field of the zone.

A still further object concerns the provision of a plurality of movable rack bars adjacently disposed to print in the vertical columns of the cards, and especially relates to the provision of a plurality of blocking means which are operated to engage different groups of said racks and blocks them from operative movement so as not to print. The control means for the blocking means permit the groups to be blocked or unblocked simultaneously or selectively, and preferably under the control of holes in the cards.

Yet another object is to provide means whereby a forty five column heading can be printed at the top of the zone forty five columns wide, and then the remainder of the zone can be printed with twenty four lines, twelve in each of the fields at each side of the zone.

Still another object is to provide means whereby, after the block of lines on one side or field of the zone are printed, the operation of the printing mechanism is shifted automatically to the other side or field thereof.

Another object is to provide means whereby the action of both printing units are nullified and no printing may take place.

Still another object is to provide means whereby the lead and/or trailer cards may be automatically segregated, especially when the trailer cards are fully printed, or when the data thereon has reached a final stage for the particular account involved, such as a final balance.

Yet another object is to provide means whereby the above mentioned objects are achieved under the automatic influence of control holes in the trailer cards which are pre-punched therein.

Further and more specific objects, features and advantages will more clearly appear from the detailed description hereinafter set forth, especially when taken in connection with the accompanying drawing which illustrates a preferred embodiment of the invention and which forms part of the specification.

In brief and general terms, the present invention contemplates the printing of up to twenty six lines in the same zone of the card, thirteen lines on one side field of the zone and thirteen on the other side field, each of twenty two characters. Suitable switches, relays, and magnets are provided which automatically switch the printing from one side of the card to the other when the first side is fully printed. The printing units are independently operable and controlled by blocking means through the intermediary of electromagnets to block one printing unit when the other is in operation. Nullifier control holes are employed so that printing is entirely blocked, when desired, to run fully printed trailer cards through with unprinted trailer cards so as to print on the unprinted cards and avoid segregation of the fully printed cards. Outfiler control holes may be provided to cause segregation of a group of similarly designated cards including a lead card, fully printed trailer cards, and partially printed trailer cards showing a predetermined final condition of the data thereon, such as zero balance, etc.

Circuit means are also provided whereby various combinations of these control possibilities may be achieved, such, for example, as printing headings across the entire forty five columns in the zone, combined with automatic line printing of twenty four lines in two groups of twelve lines of twenty two characters each, with or without nullifier controls and/or outfiling controls.

A preferred embodiment of the invention is illustrated in the drawings, wherein

Fig. 3 is a plan view of the mechanism shown in Fig. 2, with certain of the upper structure and elements removed for clarity, and showing the actuators and gate operating mechanism;

Fig. 4 is an elevation of part of the mechanism as viewed from the top of Fig. 3, showing mechanism for operating the gate for segregating cards;

Fig. 5 is a vertical section taken on the line 5—5 of Fig. 3;

Fig. 6 is a somewhat general plan view looking down on the top of Fig. 2, showing the means for operating the card stop latch bars;

Fig. 7 is a vertical section taken on the line 7—7 of Fig. 6;

Fig. 8 is a similar section showing the parts in their position when one latch bar is unblocked;

Fig. 9 is a somewhat general side view of the machine showing the non-print mechanism and its relation to the gate control mechanism;

Fig. 10 is a somewhat general view of the front of the machine showing the control button for the non-print mechanism, and its relation to the gate control and non-print mechanism;

Fig. 11 is a plan view showing the gate control mechanism when operated only by the non-print mechanism and not by the trailer card control holes;

Fig. 12 is a side elevation as viewed from the right side of Fig. 11;

Fig. 13 is a vertical section taken on the line 13—13 of Fig. 11;

Fig. 14 is a plan view of the card receiver and gate mechanism;

Figure 1:
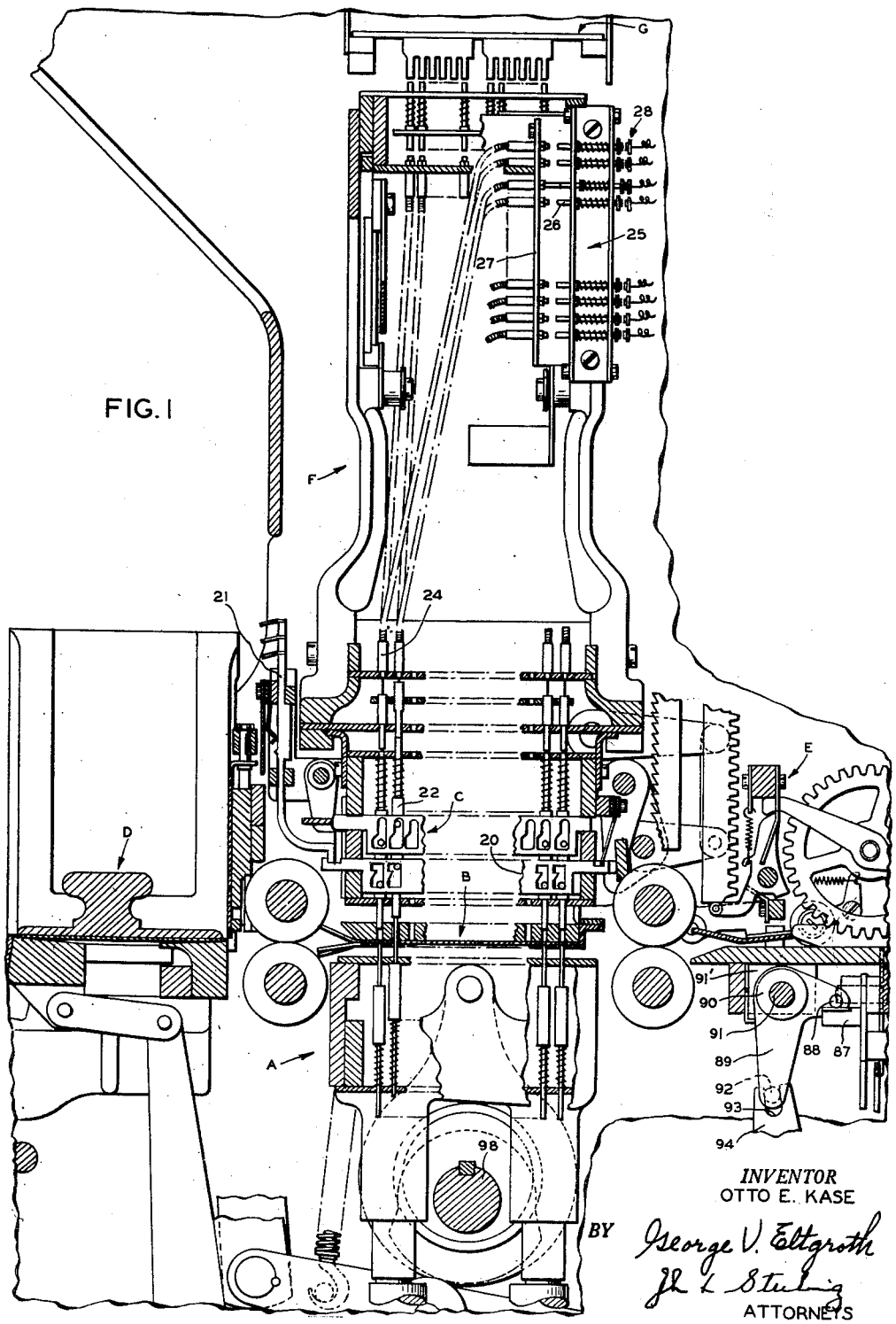
Fig. 1 is a vertical front to rear cross section through a portion of a printing interpreter in which the invention is embodied.
Figure 2:
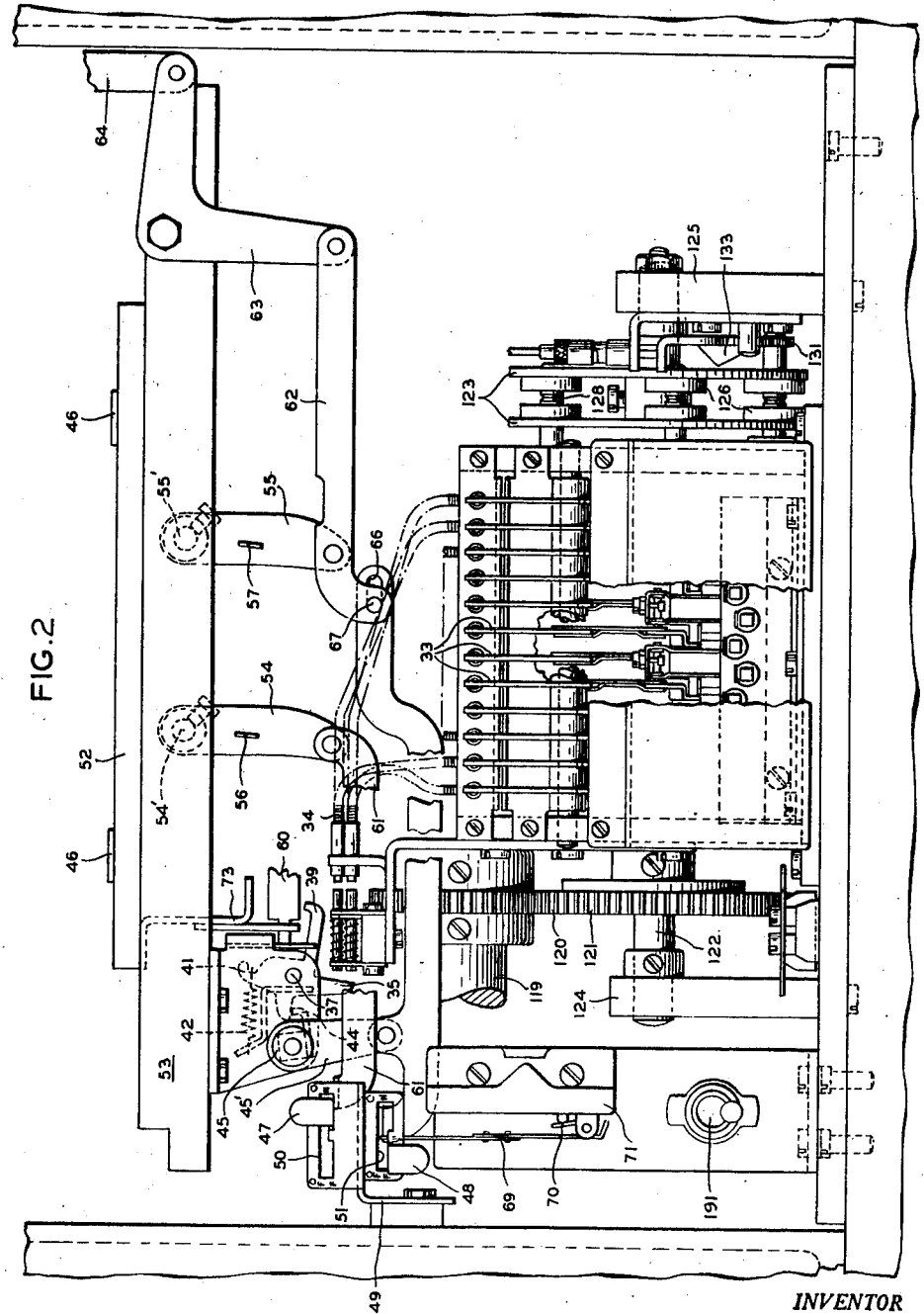
Fig. 2 is a partial rear elevation of the machine, showing the means for blocking and unblocking the card stops.
Figure 15:
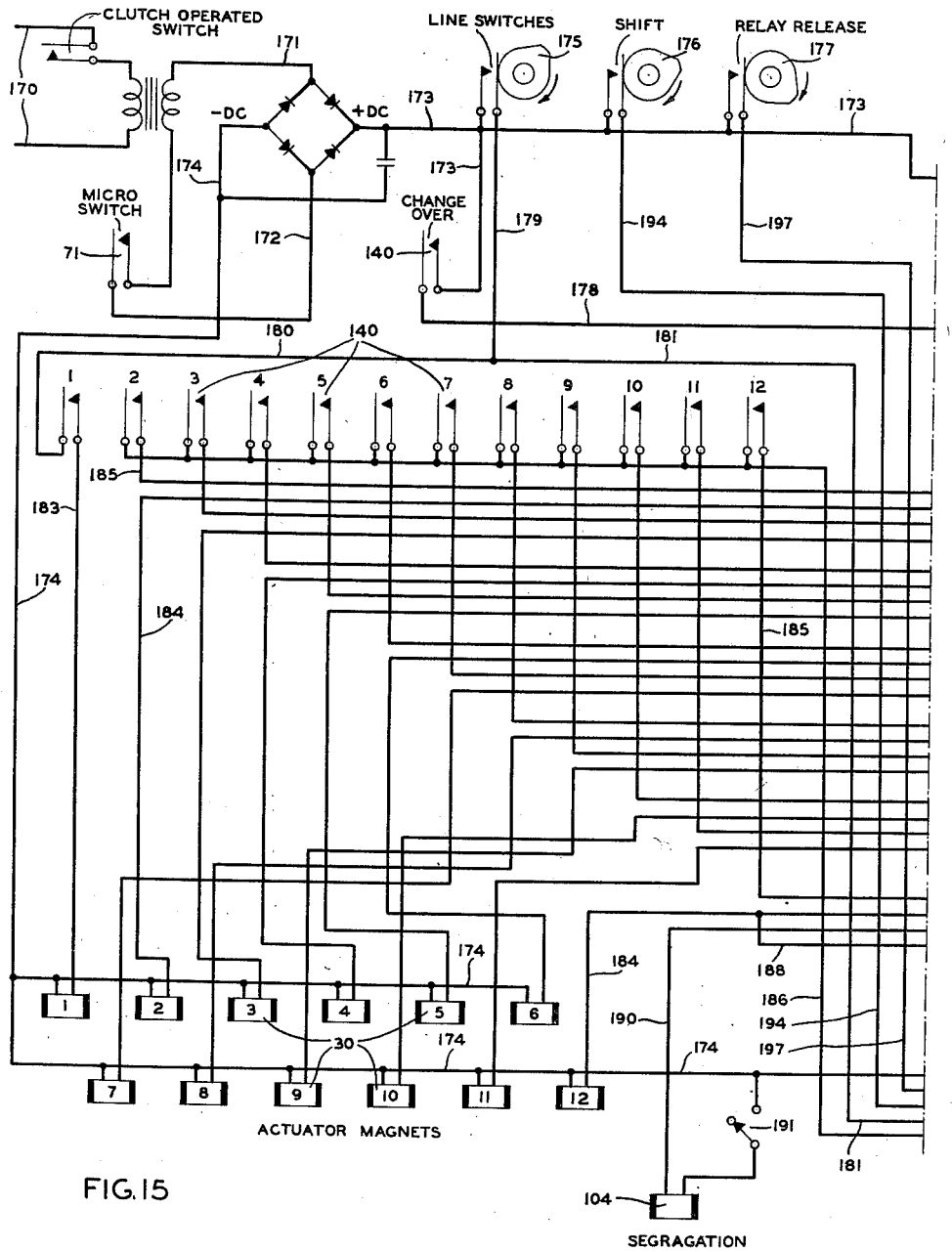
Figure 25:
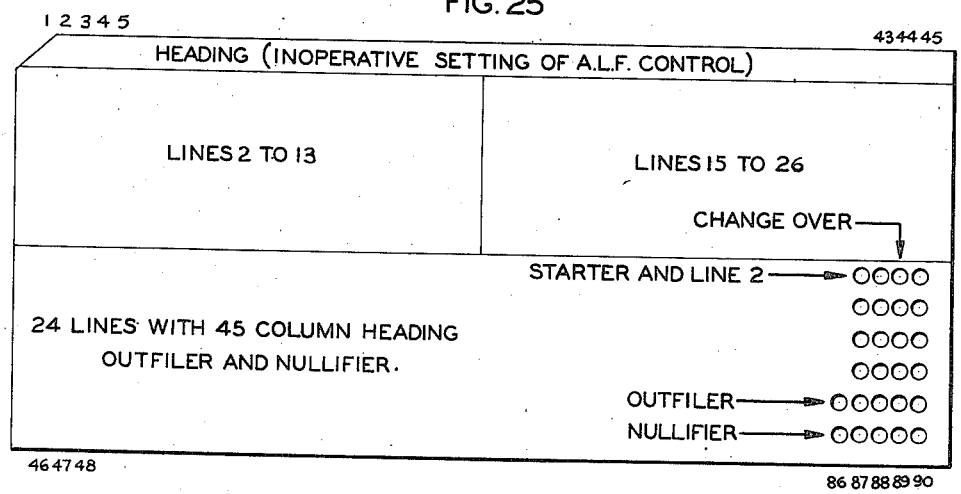
Figure 17:
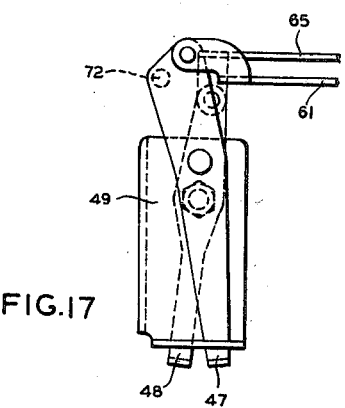
Figures 18, 19:
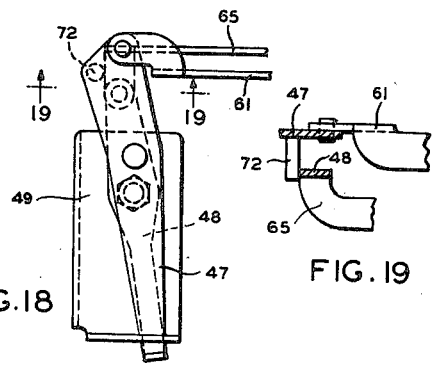
Figure 20:
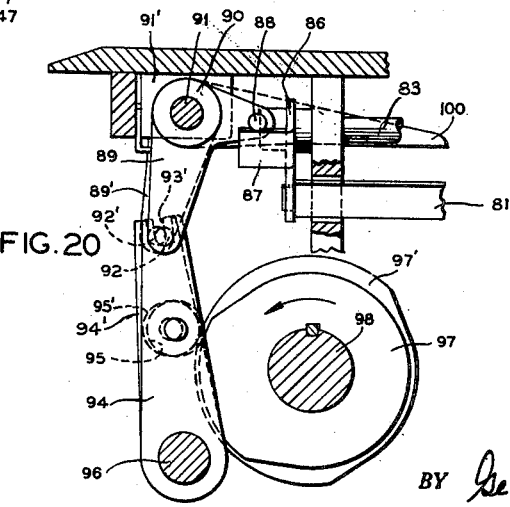
Figure 22:
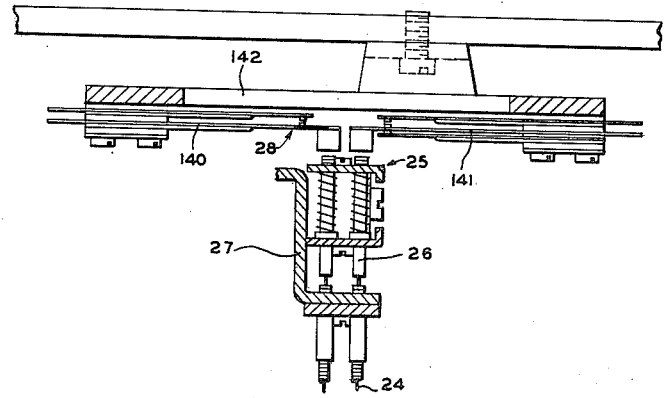
Figure 21:
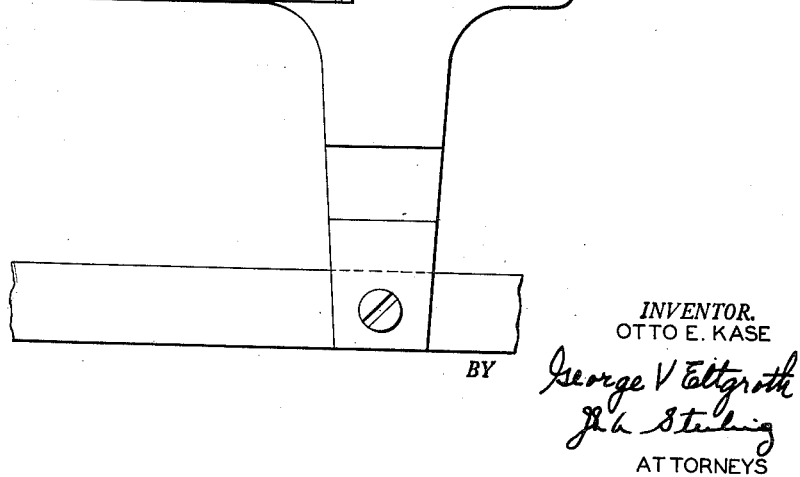
Figure 23:
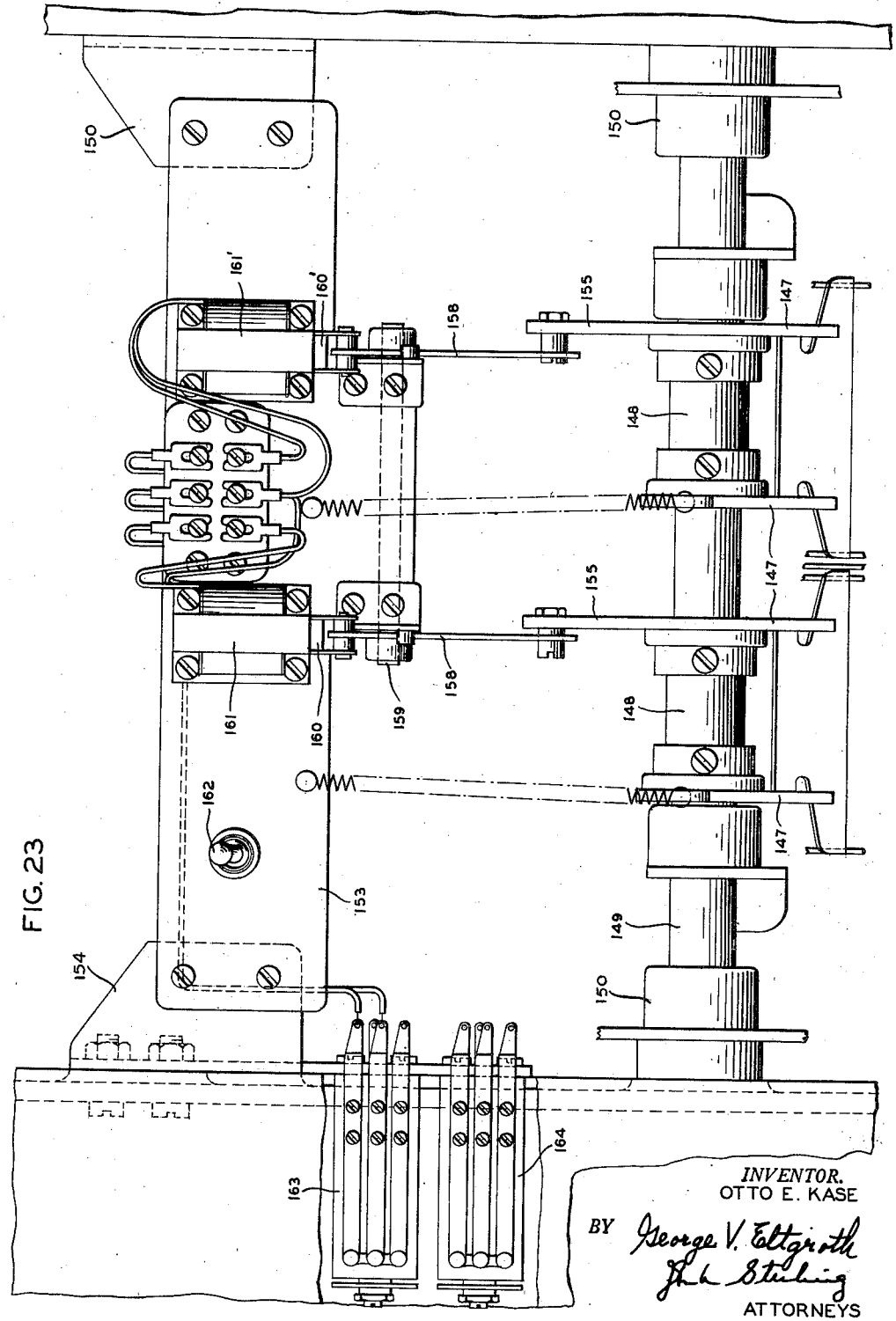
Figure 24:
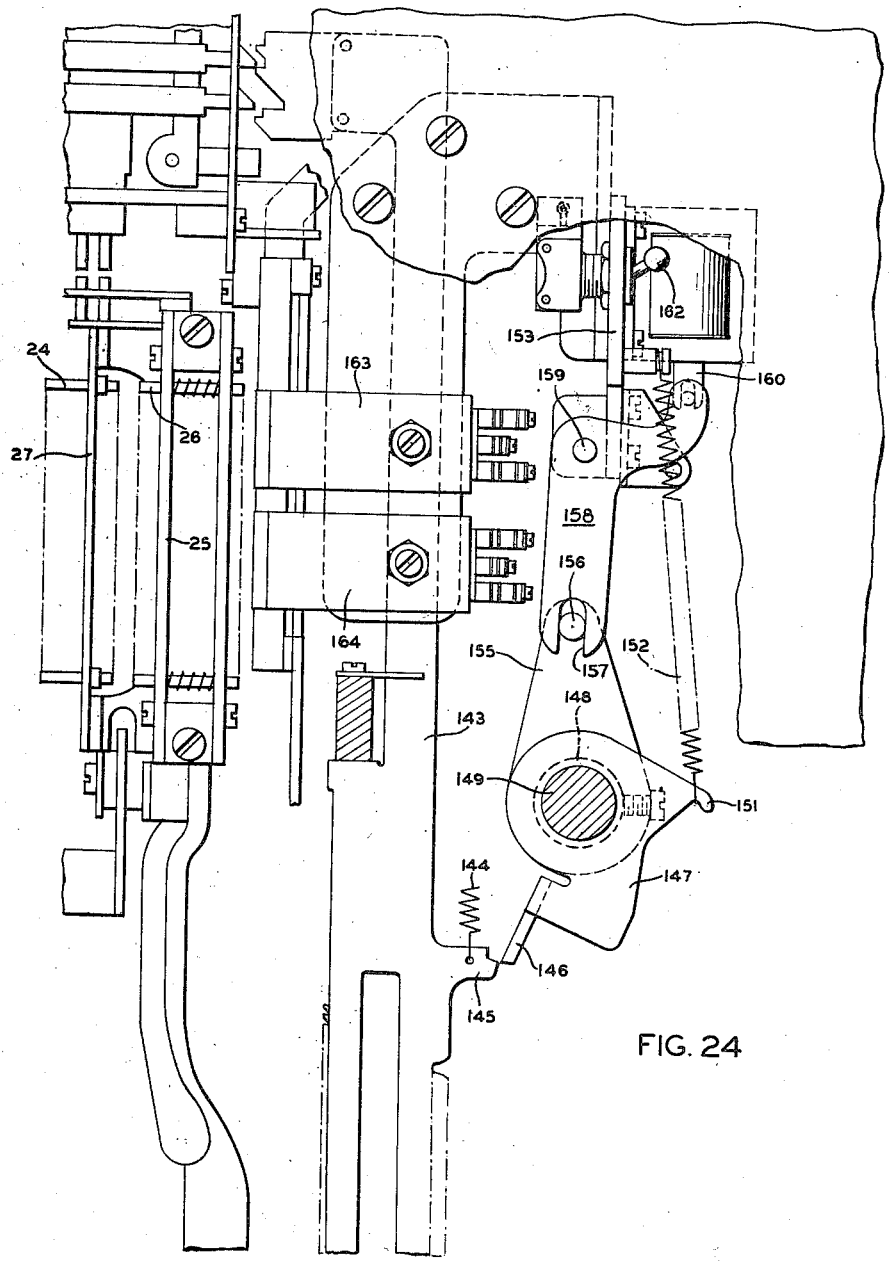

Figs. 15 and 16 taken together represent a schematic general diagram of the electrical circuits involved in the machine, with especial reference to the automatic line finding operations;

Fig. 17 is a partial plan view of the control levers for zone selection and line finding control, shown in Fig. 2 in elevation, in position when line finding is ineffective;

Fig. 18 is a similar view showing these levers in their relative positions when automatic line finding is made effective;

Fig. 19 is a detail section taken on the line 19—19 of Fig. 18;

Fig. 20 is a section taken on the line 20—20 of Fig. 7 showing the means for reciprocating the latch bars and operating the stop retract arms;

Fig. 21 is a front elevation of the switch panel indicated somewhat diagrammatically in Fig. 1;

Fig. 22 is a horizontal section taken along line 22—22 of Fig. 21;

Fig. 23 is a partial rear elevation of the machine showing the disposition of the mechanism for blocking and unblocking the separate printing units;

Fig. 24 is a partial side elevation of the mechanism shown in Fig. 23; and Fig. 25 is a plan view of a card showing a heading forty five columns wide with twenty four lines of printing, twenty two columns on each side of the upper zone twelve rows deep, illustrating one example of the use of the machine.

In a general consideration of the machine of the present it is desirable to set forth the general construction of it which is shown in the above mentioned co-pending application, and its relation to former patents over which it is an improvement, such as the following: 2,311,471, issued February 16, 1943, to R. W. Ritzert and entitled, "Printing Interpreter"; 2,426,951 issued September 2, 1947, to the same inventor with the same title; and 2,550,370 issued April 24, 1951, to John Mueller and entitled "Printing Interpreter."

The construction herein which is common to it and Patent No. 2,764,410, will now be described before denoting the parts thereof which constitute an improvement over said patent and is as follows:

In the general view of the machine shown in Fig. 1, it will be noted that there is the usual reciprocating pin box A, the card chamber B, the set pin unit C, the card magazine D, the printing mechanism E, the wiring unit F, and the permutation bar unit G. The wiring unit, except as hereinafter set forth, is of the type shown in patent to Ritzert No. 2,311,471 (Fig. 14 thereof) above mentioned, and, by means of a manually settable lever, may be set for upper or lower zone interpretation. For the purposes of this machine it will be set for upper zone interpretation. This setting will make the lower zone sensing pins ineffective with respect to the permutation bars in unit G so that, although the data in the lower zone of the cards may be sensed, such information is not printed.

Since the control holes employed to effect automatic line finding may be in any lower zone card columns, the lock slide disabling controls for these columns must be actuated to disable these slides so that the pins encountering these holes may rise and fall, but are not locked up. In the mentioned application several columns of the card were chosen as control hole columns, such as columns 88, 89, and 90. The set pin unit C has therein a series of lower column lock slides 20, which are disabled in the usual manner by means of disabling control elements 21 to hold them retracted, so that the set pins 22 may be moved up, but not locked up. Assume that a stack of cards is disposed in the magazine D, including a series of lead cards each followed by matching trailer cards, and that the data on the lead cards in the upper zones thereof is to be printed on the upper zones of the trailer cards but not to be printed on the lead cards. In that case, the usual non-print mechanism is operated so that no printing is done on the lead cards. When the lead card is sensed, the data is set up in the usual manner. The lead card then passes through the machine and is ejected into the front pocket by mechanism hereinafter described. The trailer card is advanced into the machine and is sensed, but since there are data and control holes only in its lower zone, nothing will be set up in the pin box from the data. If there is no control hole in the trailer card it will advance to the printing position, and printing will take place on the first line of the upper zone, since all the card stops will be up. If there is one control hole in the card, it will, as explained in the mentioned application, be the first control hole and it will cause the pin passing through it to actuate a set pin above that position, such as the pin 22, which will operate a Bowden wire 24 extending up in the wiring unit F to a support 25 on which are mounted a series of spring retracted pins 26 which are alined with the ends of the Bowden wires which are mounted at 27 on said support. The movement of wire 24 will move its aligned pin 26 to close an associated switch element in a switch panel 28. It is to be noted that for each control hole which may be on the card passing through the chamber B, there will be a Bowden wire 24 extending to an aligned pin 26 on the frame 25, as well as an associated switch element in panel 28. Each switch in panel 28 is connected to an electro-magnetic actuator 30 (Fig. 5), so that for each switch there is an actuator. Each actuator has an armature 31 to actuate a linkage 32 connected to a bellcrank 33. Each bellcrank 33 is adapted to engage an associated Bowden wire 34, each extending to and associated with its spring retracted pin 35.

These pins 35 are adapted to engage and operate, respectively, a series of multi-armed bellcranks 36 rotatably mounted on a common shaft 37. The pins 35 when actuated move forward to engage an arm 38 (Fig. 8), to rotate said bellcranks and cause another arm 39 thereon to be moved down. This arm 39 normally (Fig. 7) lies in blocking position in the path of a latch bar 40. The bellcrank 36 has another arm 41 engaged by a spring 42 tending to hold the bellcrank in blocking position with respect to the latch bar 40. Still another arm 43 on the bellcrank 36 is adapted to be engaged by a manually operated release bar 44 which is mounted on a rotatable bar 45 and is adapted to be operated in any suitable manner and, when operated, engages all the arms 43 of all the bellcranks 36 to lower the blocking arms 39 so that the latch bars may operate in the normal manner when automatic line finding is not to be effective.

Referring particularly to Figs. 2, 6, 7, 8, and 18-20, inclusive, it will be noted that for this embodiment there will be thirteen pairs of card stops 46. The first twelve pairs of stops controlling the printing on the first twelve lines in the upper zone of the card are under the control of the automatic line finding mechanism in a manner now to be described.

Figs. 2, 17, and 18 show two levers 47 and 48. Lever 47 is the lever which has to do with the upper or lower zone of printing to be selected, and lever 48 is the automatic line finding control lever and has two positions "On" and "Off." These levers are pivoted on a bracket 49 fixed to the frame of the machine and their outer ends operate in notched slots, such as 50 and 51.

The printing platform 52 (Figs. 2, 7, and 8) is mounted on a frame 53 in which journaled two shafts 54' and 55' from which depend two oscillatable pairs of carrier arms 54 and 55 supporting slide bars 56 and 57 adapted to extend across and cooperate with notches 58 and 59 in the upper edges of all twelve of the card stop latch bars 40, The rearmost carrier arm 54 is connected at its lower end to a link 61 which at its other end is connected to the inner end of the control lever 47, previously mentioned, and as clearly seen in Figs. 17 and 18. The carrier arm 55 is connected to a link 62 in turn connected to a bellcrank 63 pivoted on the frame element 53, and with its other end connected to a link 64 which is connected to the manual setting lever on the wiring unit of the interpreter (Fig. 14 of Rizert Patent 2,311,471, lever 208). By this lever the unit is set for upper and lower zone interpretation. The manual setting of these two arms forms no direct part of the invention as such, except that when automatic line finding operation is to be effective the lever 47 is moved to the right (Fig. 18) in its slot which moves the link 61 and arm 54 to the left of its disabling position.

With respect to the control lever 48, when it is moved to the left (Figs. 2 and 17) the automatic line finding operation is disabled, and when it is moved to the right this function is effective. The lever 48 at its inner end is connected to a link 65 which at its other end has a slot 66 therein. In this slot rides a pin 67 mounted on the dependent end of the link 62. When the link 65 is moved to the left, the end of slot 66 encounters pin 67 and moves the arm 55 to the left to a disabled position. When the lever 48 is thus moved to the right, its right edge encounters the upper end of a flexible arm 69, the outer end 70 of which is pressed against the button of a micro-switch 71 to close the circuit of the automatic line finder circuit, as will be seen in connection with the description of the circuit operation hereinafter given. With both control levers 47 and 48 disposed to the right, the inner ends thereof are moved to the left, and the left side of the rear end of the lever 48 abuts a dependent pin 72 on the lever 47 (Figs. 17, 18, and 19) and prevents the lever 47 from being moved to the left as long as the lever 48 is disposed in its right hand position. This prevents the arms from being enabled for manual setting while the automatic line finding mechanism is in effective operation.

As seen most clearly in Figs. 7 and 8, the series of twelve latch bars 40 are slidably mounted in brackets 73 and 74 dependent from the frame member 53 and each is urged to the left by a spring 76 surrounding a reduced end 75 thereof. Each latch bar 40 has a pair of extrusions 77 thereon adapted to engage notches 78 in the lower stems 79 of the card stops 46. Springs 80 are disposed between the brackets 73 and 74 and the bottom of the stops to urge these stops upwardly when released. In these figures the slide bars 56 and 57 are shown in their disabled positions with respect to the latch bars 40, so that these latch bars may be reciprocated without interference by the slide bars.

However, for automatic line finding, these latch bars are cyclically oscillated by means of a slide bar 81 mounted between a central carrier arm 82 and a bellcrank 86 fixed to shaft 83 mounted on frame 53 similar to the mounting of the shafts 54' and 55' above mentioned. A spring 84 connected at one end of the bar 81 and at the other end anchored on the support for these shafts, moves said bar 81 in one direction. The bar 81 cooperates with a notch 85 in the top of each of the twelve latch bars 40. This arm 82 is oscillated in a manner to be described, and will move the latch bars to the right against the resistance of their springs 76, and when it moves in the other direction the springs will force the latch bars to the left and tend to engage the extrusions 77 in the notches 78. The shaft 83 is oscillated by reason of the fact that bellcrank 86 at its rear end has a transversely extending arm, the outer end 87 (Figs. 6 and 20) of which is adapted to be engaged by a pin 88 on a bellcrank 89 fixed to a sleeve 90 rotatably mounted on a shaft 91 mounted in spaced brackets 91'. The lower end of the bellcrank 89 has a pin 92 riding in a fork 93 in the upper end of an arm 94 pivoted on fixed shaft 96 and having a roller 95 thereon which cooperates with a cam 97 secured on shaft 98 to effect the oscillation of the center shaft 83, and thereby the reciprocation of the latch bars. The shaft 91 is oscillated by a cam 97' on the shaft 98 and engages a roller 95' on an arm 94' pivoted on shaft 96 and having a fork 93' engaging a pin 92' on an arm 89' dependent from a sleeve 90' fixed to shaft 91 to raise and lower stop retract arms 99 and 100 which are fixed thereto and which, when lowered, press down on the card stops through the intermediary of lateral lips 101 to aline the notches on the stops with the extrusions on the latch bars, as before set forth. These retract arms are operated cyclically in accordance with the regular timed operation of the machine.

Referring now particularly to Figs. 7 and 8, the first figure shows the latch bars 40 in their extreme right hand position under the influence of the slide bar 81 with the slide bars 56 and 57 disabled and not affecting the movement of the latch bars. If the latch bars were allowed to reciprocate back and forth freely, and in view of the timed depression of stops by the retract bars 99 and 100, the latch bars would cooperatively engage their extrusions with the notches 78 in the stop stems 79 at the extreme left hand movement of the bars 40. However, it is desired in this instance to allow the stops to be lowered and raised cyclically, and not to be held down except for a particular circumstance. In order to hold the stops down only when desired, a mechanism is provided which has been described and includes the multi-armed bellcranks 36 operated under the control of the actuators 30 which are in turn under the influence of the control holes in the card being sensed. These bellcranks are mounted on the shaft 37 in a supporting bracket 102 attached to the frame of the machine.

When a card (which is "fully posted") enters the interpreter it is often desired to segregate it from the cards which have not been thus posted. In order to achieve this object the following mechanism is provided:

In Fig. 2 is shown a switch 191 which is also indicated in the circuit of Fig. 15. This switch controls the opening and closing of a circuit to a thirteenth actuator numbered 104 (Fig. 4). The armature 105 of this actuator 104 is connected to a linkage 106 which is connected to one end 107 of a pivoted lever held in normal position by a spring 108. The opposite end of this lever is formed as a cam shaped interponent 109. It is seen that when the actuator 104 is energized it will cause the cam shaped interponent 109 to be advanced from its normal position shown in Fig. 4.

With special reference to Figs. 4, and 9 to 14, inclusive, there is shown the mechanism whereby the master cards may be segregated into a special pocket upon the setting of the "non-print" or retract mechanism of the machine, and whereby the trailer cards being interpreted may also be segregated therewith when they are fully posted. Some of the mechanism shown is part of the regular interpreter, and will not be described in detail except in so far as to indicate how it cooperates with the novel mechanism related to the line finding mechanism.

In Fig. 9 is shown a general view of a non-print mechanism in use on the interpreter which, in its operation, cooperates in the segregation of the "fully posted" cards. The mechanism is generally indicated by the letter H. A button 110 is operated to set a link 111 to dispose the mechanism for segregation and non-print operations. The non-print function is brought into play by the sensing of a control hole in the card which lifts a connection and pin 113 in the wiring unit to raise arm 113' on shaft 115 (Fig. 7 of above patent, pin 85, arm 87, and shaft 86). Shaft 115 is connected to arm 114 in turn connected to link 116 which is lifted and causes the rocking of shaft 112. On this shaft is an arm 117 which is thereby moved counterclockwise to move a Bowden wire 118 downwardly. This wire at its other end is adapted to engage the lower end of the pivoted lever 107 previously mentioned. It will, therefore, be evident that this lever 107 is operated either through the intermediary of the "non-print" mechanism, just generally described, or by the sensing of a particular segregation control hole in the card in order to segregate said card after it is thus fully posted.

The mechanism which is activated by the described movement of the pivoted lever 107 involves mechanism shown in detail in Figs. 11, 12, and 13. A main shaft 119 carries a gear 120 meshing with a gear 121 on a shaft 122 to which is secured a pair of spaced plates 123. The shaft 122 is supported between uprights 124 and 125. Disposed on adjacent faces of the plates 123, and equally spaced angular distances adjacent the periphery thereof, are bosses 126 in which are positioned, for longitudinal movement, buttons 127. The stems of these buttons are each provided with a pair of annular spaced notches 128. These buttons are adapted to be moved axially, as will be later set forth, and, therefore, one or the other of these notches is presented between the bosses 126 as shown in Fig. 11 and are engaged by a coiled spring 129 to hold the buttons 127 in one or the other of their two positions. In the figure the buttons are shown in both positions.

In the operation of the machine, the sensing of a "non-print" control hole to actuate the Bowden wire 118, and the sensing of the last hole in a card which is to be fully posted, are so timed in the sequence of operations of the various elements of the machine, and which it is not necessary to describe in detail, that when these sensing actions take place, the button 127 disposed opposite the pivoted lever 107 is moved forward to effective position, in which it will encounter the edge 130 of a lever 131 pivoted to the support 125. This edge is normally eccentric to the circular path of the buttons, so that as the button thus advances and encounters this edge, it will depress this end of the lever 131 and elevate the opposite end which is associated with a Bowden wire 132. After the projected end of the button has left the edge of the lever 131, it will encounter a cam plate 133 on the support 125 which will cam it back to normal position wherein the spring 129 will engage the other notch in its stem to hold it back in retracted position until it is again pushed forward. In the timing of these operations a button is presented in front of the lever 107 at the time when a control hole of one or the other kind is sensed to effect the operation of the gate 90° later.

Referring to Figs. 9 and 14, it will be seen that when the Bowden wire 132 is operated, it elevates an arm 134 connected to front gate shaft 135. In Fig. 14 a general plan view of the gate mechanism is shown, and the shaft 135 has secured thereon gates 136, so that when the shaft is turned the gates will be elevated to guide the card into the front pocket. Various mechanisms are already known in the art for actuating these gates to direct cards into the front pocket, and no further description of this structure is deemed necessary, since the only novel feature herein involved is the means whereby the gate mechanism is operated either by the sensing of a lead card or the sensing of a "fully posted" trailer or detail card.

DESCRIPTION OF IMPROVEMENTS

Having described the general construction of the machine of the application above mentioned, the improvements made therein which constitute novel features of the present invention will now be set forth.

With the improved machine, problems of different characters may be presented and Fig. 25 herein shows a card, illustrative of one use of the improved machine in which the card is to have a forty-five column top line heading and the rest of the upper zone thereof is to be printed with twenty-four lines of data, twelve lines on each side, each line being of twenty-two columns or characters. The card shown is assumed to have been fully printed and shows a complete set of control holes, including starter hole, change over hole, outfiler hole and nullifier hole, the use and function of each of which will be subsequently set forth as this description proceeds. These holes occupy columns 86, 87, 88, 89 and 90 in the lower zone of the card.

Referring now to Figs. 21 and 22 there is shown the new improved form of actuator switch assembly in which on the left (Fig. 21) are thirteen primary make switches 140 and on the right thirteen secondary break and make switches 141. These are mounted on a suitable bracket 142 supported from the frame of the machine in any suitable manner. As shown in Fig. 22, these switches are operated by control holes in the card through the intermediary of the Bowden wires 24 and the associated elements 26. Their respective functions and operations will be set forth in detail in connection with the description of the circuit operation to follow.

Referring to Figs. 23 and 24 there is seen the means for blocking off printing on either or both sides of the card, as may be desired. There is shown one of the vertically movable printing rack bars 143 normally moved up by a spring 144 when released, and having a rearwardly extending lip 145 near its lower end. This lip is adapted to be engaged by an abutment plate 146 which is of a length sufficient to stop the upward movement of several racks of a group. In the drawing two of these abutment plates are shown adapted to block movement of one or the other or both of two groups of racks. One group corresponds to printing means for one side of the card and the other for the other side thereof. These abutment plates are mounted on spaced dependent arms 147 connected in pairs of sleeves 148 mounted on a shaft 149 which is journaled at its ends in bearing members 150 fastened to upright frame members. One of each pair of arms 147 is provided with a projecting ear 151 to which one end of a spring 152 is connected, the other end of the spring being fastened to a cross plate 153 disposed above the shaft 149 and at its ends connected to brackets 154 attached to the machine frame. These springs 152 tend to rotate the sleeves and their connected parts in a counterclockwise direction as viewed in Fig. 24.

To each sleeve 148 is connected an upright arm 155 having an upper stud 156 thereon adapted to ride in the slotted end 157 of an arm of an associated bellcrank 158 pivotally connected at 159 to the lower edge of plate 153. The other arms of said bellcranks are connected in any suitable manner to the lower end of the armatures 160 and 160' of magnets 161 and 161', respectively, mounted on the face of the cross plate 153. When either magnet is energized the armature is pulled up and this swings the abutment 146 into position above the related lips 145 of the racks so as to prevent their upward movement to printing position. These magnets 161 and 161' may be operated separately to block printing only on one side of the card or both may be operated to block printing entirely. These operations will be more detailed in a description of the circuit and its operations hereinafter given. Each abutment plate 146 is wide enough to block twenty two printing racks.

A switch 162 is mounted on the cross plate 153 and its function will later be set forth. Similarly relays 163 and 164 are mounted on the frame adjacent the above mentioned mechanism one for nullifier operations and the other for change-over operations, both of which will be hereinafter described more in detail with respect to the circuit operation.

Circuit and operation

The circuit is shown in Figs. 15 and 16. Wires 170 from a source of power lead to a transformer primary and in this circuit is a clutch operated switch which is closed only when a working cycle of the machine is initiated. The secondary of the transformer is connected to a rectifier by wires 171, 172 and in this circuit is the manually operated micro-switch 71 previously mentioned. Wires 173 and 174 extend from the D. C. side of the rectifier, the first being the positive wire and the second the negative. The positive wire 173 connects directly with the nullifier switch 141; to the change-over switch 140'; and to the switches controlled by the line switch cam 175, the shift switch cam 176, and the relay release cam 177, respectively. The negative wire 174 connects directly to the negative side of the actuators 30, the segregation magnet 104 through manual switch 191, the nullifier relay coils 163, and 163', the change-over relay coils 164 and 164', and the print blocking magnets 161 and 161', respectively.

The change-over switch 140' on one side is connected by wire 178 to the change-over relay 164. The line switch operated by cam 175 is on one side connected by wire 179 to a wire 180 leading to one side of the No. 1 actuator switch 140 and to a wire 181 leading to normally closed contacts of the nullifier relay 163 as well as by wire 182 to normally open contacts of the outfiler switch 141.

One side of the No. 1 actuator switch 140 is connected by wire 183 to the No. 1 actuator magnet 30. One side of the No. 2 actuator magnet 30 is connected by wire 184 to normally closed contacts on the No. 2 switch 141 and thence by wire 185 to one side of the No. 2 actuator switch 140. It is to be noted that one side of each of the actuator switches 140 Nos. 2 to 12, inclusive, are thus connected to corresponding closed contacts of the break-make switches 141. The other sides of these switches 140, Nos. 2 to 12, inclusive, are connected by a wire 186 to normally closed contacts on the change-over relay 164 and thence by wire 187 to the normally closed contacts on the nullifier relay 163 and through it by wires 181 and 179 through the switch controlled by line cam 175, to wire 173, to the rectifier.

Connected to the wire 184 leading from one side of the No. 12 actuator magnet 30 is a wire 188 leading to normally open contacts on the change-over relay 164. To the other side of these contacts is connected a wire 189 leading to normally closed contacts on the outfiler switch 141. From this latter point a wire 190 extends to the segregation magnet 104. The other side of this magnet is wired through a switch 191 to wire 174 leading to the negative side of the rectifier. All the normally open contacts of the switches 141 Nos. 2 to 12, inclusive, are connected by wire 192 to a wire 193 leading to normally open contacts on the change-over relay 164.

The rectifier through wire 173 is connected to the switch operated by cam 176 to connect to a wire 194 leading to normally closed contacts on the change-over relay 164, and thence over wire 195 to print blocking magnet 161', thence over wire 174 through switch 162 to the negative side of the rectifier. Wire 195 also leads to normally open contacts on the nullifier relay 163. Normally open contacts on the change-over relay 164 are connected by wire 196 to normally open contacts on the nullifier relay 163 and to one side of the print block magnet 161, the other side of which is connected to the negative side of the rectifier through wire 174 and switch 162.

The rectifier is connected over wire 173 to the relay release switch operated by the cam 177, over wire 197 leading to one side of both reset coils 163' and 164'. The other sides of these two coils are connected to the wire 174 leading to the negative side of the rectifier.

The circuit illustrated is adapted to handle the application wherein a card is to be printed with a forty five column heading as shown. This heading can be printed with the same interpreter but with a standard wiring unit and with the automatic line finder switch 71 set in inoperative position. Cards thus to be headed must have no control holes therein. Pre-interpreted heading cards will receive their starter hole punching automatically while being merged with their lead cards.

Fig. 25 shows a card in somewhat schematic form which has a heading and has also been printed on twenty-four lines in the upper zone thereof, twelve lines in the fields on each side of said zone, each line twenty-two columns wide. This card is shown as provided with starter, change-over, outfiler, and nullifier holes which have, however, not all been punched therein at the same time but occupy lower zone columns 86, 87, and 89. In such a card the starter hole will be connected to cause printing on line 2, of the left field. With the switch 71 in operative position and power applied, the clutch switch is closed and the rectifier applies power directly to the three switches operated by cams 175, 176, and 177; to the change-over switch 140', and the negative side of the rectifier is connected directly as above described. This direct positive connection allows time for the energization, when necessary, of the change-over and nullifier relays before the actuator switches 140 and 141 are closed. The cam 175 closes its switch late enough in the cycle to permit this preliminary set up to take place. With this switch closed current passes over wire 179, wire 180 directly to the control actuator switch 140 No. 1, thence over wire 183 through the No. 1 actuator magnet 30 to wire 174 and back to the rectifier. This action positions the card for printing on the second line by causing the first pair of stops 46 to be held down. While this is happening the cam 176 closes its switch and current passes thence over wire 194 to close contacts on the change-over switch thence over wire 195 to the winding of printing block magnet 161', thence to wire 174 and back to the rectifier. This action blocks printing in the right side or field of the card which covers lines 15 to 26. Printing then takes place in the proper sequence of the cycle and then the cam 177 closes its contacts and current passes over wire 197 and operates both reset coils 164' and 163' to restore the contacts of the change-over and nullifier relays which may have been moved from normal position. It must be remembered that switch 162 must be closed when the blocking magnets are to be operated.

After the card is thus printed on line 2 it passes to a card receiving chamber in the usual manner. When it is then again run through the multi-control reproducer it receives the second control hole and is passed through the machine herein and is printed on the third line. This operation is repeated until lines 1 to 12 on the left side or field of the upper zone of the card are printed. When the card is then passed through the reproducer it receives the change-over control hole marked on the card shown in Fig. 25. This will cause the actuation of the change-over switch 140' whereby current passes therethrough over wire 178 to the change-over relay 164 and back to the rectifier over wire 174. This will shift the contacts on this relay and cause the normal connection between wires 186 and 187 to be broken whereby the return from the actuator switches 140 is broken and will place the wire 187 in connection with wire 193 which is the return wire from the actuator switches 141. The No. 1 switch 140 which is operated each cycle from its control hole, causes the printing to take place on the fifteenth line since the circuit completed thereby is not affected by the energization of the change-over relay 164. It is to be noticed that the circuit of switch 140 No. 1 is independent of those of all the other switches 141 since it is connected directly across the line through the No. 1 actuator 30 on one side and the switch operated by cam 175 on the other. The operation of the cams 175, 176, and 177 is repeated. When the next control hole is put into the card it will cause the actuation of the switch 141 No. 2 since the change-over hole is effective to energize the relay 164. It must be noted that when the relay 164 was first energized it shifted the connection of wire 194 from wire 195 to wire 196 so that when cam 176 closed its switch the blocking magnet 161 will be energized to block printing on the left side of the card and permit it on the right side. It is to be understood that after each line is printed the card is passed through the reproducer to receive additional holes one at a time.

When the No. 2 switch 141 is actuated, with the relay 164 energized, the circuit may be traced as follows: From wire 174 through No. 2 magnet 30, wire 184, through No. 2 switch 141, wire 193, through change-over switch, wire 187, through nullifier switch, wire 181, wire 179, through switch operated by cam 175, wire 173 to the rectifier. As successive holes are punched in the card the successive switches 141 are additionally closed and the material printed on successive lines on the right side of the card. When the hole for the twelfth switch 141 is sensed to print on the twenty sixth line of the card, the card is then fully posted and is to be segregated under ordinary circumstances. Therefore, when this switch is closed one circuit can be traced as follows: From wire 174 through No. 12 actuator magnet 30 over wire 184 to No. 12 switch 141, which is actuated, wires 192, 193, switch at relay 164, wire 187, switch at relay 163, wire 181, 179 and back to rectifier as before. Another circuit is also closed as follows: From segregation magnet 104, wire 190, normally closed contacts of outfiler switch wire 189, to now closed contacts on relay 164, wire 188, wire 184 to switch 141 No. 12, wire 192, wire 193, now closed contacts of change-over relay, wire 187, closed contacts on nullifier relay wire 181, wire 179, back to rectifier. This magnet 104 operates the card gate above mentioned to segregate the card, which is fully posted, into the special or first pocket.

When a card is so punched with information that a final balance or other condition is reached before all the lines thereon are printed, it is desired to segregate said card no matter on which line thereof the final printing has taken place. Therefore, when this condition is achieved the card, in well known manner, is punched with a special hole called an "outfiler" hole as shown in Fig. 25. Through this hole the outfiler switch 141 is operated at any desired time. When so operated a circuit is closed as follows: From the rectifier, wire 173, switch operated by cam 175, wire 179, wire 181, wire 182 to outfiler switch 141, which is now actuated, wire 190, through segregation magnet 104, switch 191 to wire 174 back to the rectifier. Thus at any time the outfiler switch is actuated, the card is segregated.

When for any reason, it is desired not to print on a card, which may be a fully posted card which is to be run through the machine and not outfiled, or for any other reason, the card is, previously to such operation, punched with a nullifier hole such as shown in Fig. 25. When this hole causes the closing of the nullifier switch 141 the following circuit may be traced: From rectifier over wire 173 to closed nullifier switch 141, wire 198, nullifier relay 163, wire 174 back to the rectifier. When this relay 163 is actuated its contacts are shifted to disconnect wires 181, and 187, thus disconnecting from the power all the switches Nos. 2 to 12, inclusive, numbered 140 and 141. This shift closes contact between wires 195 and 196 putting both blocking magnets 161 and 161' in circuit as follows: From wire 174, switch 162, now closed, magnet 161', wire 195, closed contact on relay 164, wire 194, back to rectifier through switch operated by cam 176. Also from wire 174, switch 162, blocking magnet 161, wire 196, closed contact on relay 163, wire 195, closed contact on relay 164, wire 194 and back to rectifier as before. In this manner both blocking magnets are energized to operate both abutment plates 146 and prevent printing on either side of the card.

If the relay 164 is actuated then these nullifier control circuits are to be traced as follows: From wire 174, through switch 162, magnet 161', wire 195, through closed contacts on relay 163, wire 196, through now closed contacts on relay 164, wire 194 back to rectifier as before; also from wire 174, switch 162, magnet 161, wire 196, through now closed contacts on relay 164, wire 194 back to the rectifier as before.

It will thus be seen that this invention enables a card to be printed with a heading and then printed on twenty four lines in the upper zone, twelve on each side or field of the zone, by successive passages of the card through the device between which passages the card is provided with the necessary control holes of the various kinds mentioned and for the purposes mentioned.

While the invention herein has been fully shown and described in detail with respect to one present preferred form which it may assume, it is not to be limited to the specific form shown since many changes and modifications may be made in the structure and circuits to meet different practical problems without departing from the spirit and scope of the invention in its broadest aspects. Hence it is desired to cover any and all forms and modifications of the invention which may come within the spirit and scope of any one or more of the appended claims.

What I claim as new, and desire to secure by Letters Patent is:

1. In a printing interpreter having a series of adjacently disposed movable rack bars one for each column of a card, and adapted to print on horizontal lines on a card, card stops for positioning the card with respect to the several lines on the card, and means operated by control holes in the card to selectively operate the card stops to determine the printing line; the improvement which comprises a plurality of means for engaging and blocking the operation of groups of said rack bars, means for rendering all the blocking means ineffective, means for rendering all the blocking means effective, and means for selectively rendering the blocking means effective.

2. In a printing interpreter having a series of adjacently disposed movable rack bars one for each column of a card, and adapted to print on horizontal lines on a card, card stops for positioning the card with respect to the several lines on the card, and means operated by control holes in the card to selectively operate the card stops to determine the printing line; the improvement which comprises a plurality of means for engaging and blocking the operation of groups of said rack bars, manually operated means for rendering all the blocking means ineffective, means activated by a special control hole in a card for rendering all the blocking means effective, and means activated by another special control hole in the card for rendering the blocking means selectively effective.

3. In a printing interpreter having a series of adjacently disposed movable rack bars one for each column of a card, and adapted to print on horizontal lines on a card, card stops for positioning the card with respect to the several lines on the card, and means operated by control holes in the card to selectively operate the card stops to determine the printing line; the improvement which comprises projecting lips on said racks into the path of said lips to prevent printing, manually operated means to render both blocking abutment plates ineffective, means activated by a special control hole in the card to render both said abutment plates effective, and means activated by another special control hole in the card to render said abutment plates selectively effective one at a time.

4. In a printing interpreter having a series of adjacently disposed movable rack bars one for each column of a card, and adapted to print on horizontal lines on a card, card stops for positioning the card with respect to the several lines on the card, and means operated by control holes in the card to selectively operate the card stops to determine the printing line; the improvement which comprises projecting lips on said racks, and a pair of blocking abutment plates each disposed in cooperative relation to substantially half of said rack bars and means for moving them into the path of a group of said lips to prevent printing.

5. In a printing interpreter having a series of adjacently disposed movable rack bars one for each column of a card, and adapted to print on horizontal lines of a card, card stops for positioning the card with respect to the several lines on the card, and means operated by control holes in the card to selectively operate the card stops to determine the printing line; the improvement which comprises projecting lips on said racks, blocking abutment plates and means for moving them into the path of groups of said lips to prevent printing, magnets for moving said abutment plates into blocking position, cyclically operated means for energizing said magnets, and a relay controlled by a special control hole in the card the contacts of which relay determine which blocking magnet is to be energized.

6. In a printing interpreter having a series of adjacently disposed movable rack bars one for each column of a card, and adapted to print on horizontal lines on a card, card stops for positioning the card with respect to the several lines on the card, and means operated by control holes in the card to selectively operate the card stops to determine the printing line; the improvement which comprises projecting lips on said racks, blocking abutment plates and means for moving them into the path of groups of the lips to prevent printing, magnets for moving said abutment plates into blocking position, cyclically operated means for energizing said magnets, a relay controlled by a special control hole in the card, the contacts of which relay determine which blocking magnet is to be energized, manually operated means to render all the blocking abutment plates ineffective, means for rendering all the blocking abutment plates effective, and means for rendering the blocking abutment plates effective one at a time.

7. In a printing interpreter having a series of adjacently disposed movable rack bars one for each column of a card, and adapted to print on horizontal lines on a card, card stops for positioning the card with respect to the several lines on the card, and means operated by control holes in the card to selectively operate the card stops to determine the printing line; the improvement which comprises projecting lips on said racks, blocking abutment plates and means for moving them into the path of groups of the lips to prevent printing, magnets for moving said abutment plates into blocking position, cyclically operated means for energizing said magnets, a relay controlled by a special control hole in the card, the contacts of which relay determine which blocking magnet is to be energized, a manually operated switch which when open renders all the blocking abutment plates ineffective, means activated by another control hole in the card to render both blocking abutment plates effective, and means activated by still another control hole in the card to render one or the other of said blocking abutment plates effective.

8. In a printing interpreter having means for feeding lead and trailer cards along one path, means for printing on horizontal lines on the trailer card, card stops for positioning the trailer card with respect to different lines to be printed thereon, means operated by control holes in the trailer card corresponding to lines printed thereon to selectively operate the card stops to determine the line on said trailer card to be printed on and means for segregating said lead and trailer cards; cards, the improvement which comprises means activated by a special control hole in the trailer card to make said segregating means effective after any line is printed on the trailer card.

9. In a printing interpreter as set forth in claim 8, in which said card segregating means comprises a circuit including a card segregating magnet, contacts adapted to be closed by said control hole operated means when a special control hole in the card is sensed to energize said magnet and segregate the card after a predetermined number of lines in one field of the card is printed.

10. In a printing interpreter as set forth in claim 8 in which printing is done in different fields on the trailer card and in which the card segregating means comprises a circuit including card segregating magnet means, contact means activated by a special control hole in the card to make the said segregating magnet means effective after any line of the card is printed, and contact means activated by another special control hole in the card to make the segregating means effective after all the lines on both fields of the card are printed.

11. In a printing interpreter having means to print on horizontal lines on cards fed along one path, card stops for positioning selected cards for printing with respect to lines previously printed on said selected cards, means operated by control holes in the selected card to selectively operate the card stops to determine the line to be printed on said selected card, a circuit including a card segregating magnet, break make contacts in circuit with the magnet, means activated by a special control hole in the selected card to actuate said contacts to connect said magnet directly to a source of power in order to segregate the selected card after any line thereon has been printed, and means activated by another special control in the card to segregate the card after all the lines on said card are printed and said break-make contacts are in normal position.

12. In a printing interpreter, a power line, a cam operated line switch, a nullifier relay connected to the line, a normally open nullifier switch in said connection operated through the intermediary of a control hole in a card, normally closed contacts on said relay, a change-over relay connected to the line, a normally open change-over switch in said connection operated through the intermediary of a control hole in a card, normally closed contacts on said change-over relay, actuator magnets, one side of said magnets connected to one side of the line, secondary actuator break-make switches, the closed contacts of which are connected in series respectively, with said magnets, primary actuator switches having normally open contacts in series with the last mentioned closed contacts, the open contacts of the primary actuator switches being in series, respectively, with the normally closed contacts on the change-over relay and the nullifier relay, one side of the line switch being connected in series with the normally closed contacts of the nullifier relay, the other side of the line switch being connected to the other side of the line, said magnets being actuated when any one or more of the primary actuator open contacts are closed through the intermediary of a control hole in a card.

13. The invention of claim 12 further characterized in that closing of the nullifier switch contacts through the intermediary of a control hole in a card energizes the nullifier relay and opens its normally closed contacts whereby the primary and secondary actuator switches and the actuator magnets are disconnected from the line.

14. The invention of claim 12 further characterized in that closing of the change-over switch contacts through the intermediary of a control hole in a card energizes the change-over relay, and opens the normally closed contacts thereof, normally open contacts on said change-over relay closed when said relay is energized, said last mentioned contacts being connected to the normally open contacts on each of secondary actuator break-make switches whereby the energization of the actuator magnets is now transferred from the primary to the secondary actuator switches.

15. In a printing interpreter, means for sensing a card having control holes therein, a power line including a cam operated line switch, an outfiler switch including break-make contacts, means for operating said switch when an outfiler control hole in the card is sensed, means for segregating the cards that have a predetermined number of postings printed thereon, a segregation magnet in a circuits with contacts of said outfiler switch for controlling said segregated means, and said line switch being connected to the normally opened contacts of the outfiler switch whereby the segregation magnet is energized whenever the outfiler switch contacts are operated.

16. The invention of claim 14 further characterized in that a break-make outfiler switch has its make contacts connected to the line switch, a segregation magnet connected to the break contact of the outfiler switch, said magnet being connected to the line switch when the outfiler switch is operated through the intermediary of a control hole in a card, another pair of normally open contacts on the change-over relay, the last one of the series of actuator magnets connected to one of the last mentioned pair of normally open contacts, the other of said contacts being connected to one of the normally closed contacts on the outfiler switch whereby the segregating magnet is energized, independently of the outfiler switch operation, after the change-over relay is energized and the last actuator magnet is energized through the operation of its secondary break-make switch through the intermediary of a control hole in a card.

17. In a printing interpreter, a power line, a pair of print blocking magnets, a change-over relay, a cam-operated line switch, a change-over switch in series with said line switch and adapted to be closed through the intermediary of a control hole in a card, the other side of the change-over switch connected to the change-over relay, a cam-operated shift switch connected on one side to the line, the other side thereof connected to the mid contact of a break-make switch on said relay, one of the blocking magnets connected to the normally closed contacts of the break-make switch and the other blocking magnet connected to the normally open contact of the break-make switch whereby one blocking magnet will be in circuit when the relay is energized and the other blocking magnet will be in circuit when the relay is deenergized, the other sides of the blocking magnets being connected to the other side of the line.

18. The invention of claim 17 further characterized in that there is a nullifier relay, a nullifier switch connected on one side to the line and on the other side to said nullifier relay, said switch being adapted to be operated through the intermediary of a control hole in a card, a pair of normally open contacts on said nullifier relay, one of said contacts being connected to one blocking magnet and the other being connected to the corresponding side of the other blocking magnet whereby the said blocking magnets are disposed in parallel when the relay is energized, the other sides of said blocking magnets being connected to the other side of the line, the corresponding sides of the blocking magnets being connected to the cam-operated shift switch through the break-make contacts of the change-over relay in either position of the relay, whereby printing on both sides of the card is prevented.

19. In a printing interpreter, means for sensing a card having control holes therein a power line including a cam-operated line switch connected on one side to the line, a primary make actuator switch, a primary make actuator magnet connected at one side to said actuator switch, the other side of the actuator magnet being connected to the other side of the line, and said primary actuator switch being closed by said sensing means when the latter senses a predetermined control hole in the card.

References Cited in the file of this patent

UNITED STATES PATENTS

| | | |
|---|---|---|
| 1,620,068 | Bryce | Mar. 8, 1927 |
| 1,954,041 | Daly | Apr. 10, 1934 |
| 1,962,735 | Ford | June 12, 1934 |
| 2,016,709 | Eichenauer | Oct. 8, 1935 |
| 2,034,010 | Thomas | Mar. 17, 1936 |
| 2,066,029 | Carroll | Dec. 29, 1936 |
| 2,240,667 | Paris | May 6, 1941 |
| 2,311,471 | Ritzert | Feb. 16, 1943 |
| 2,576,903 | Imm | Nov. 27, 1951 |